Patented Mar. 8, 1927.

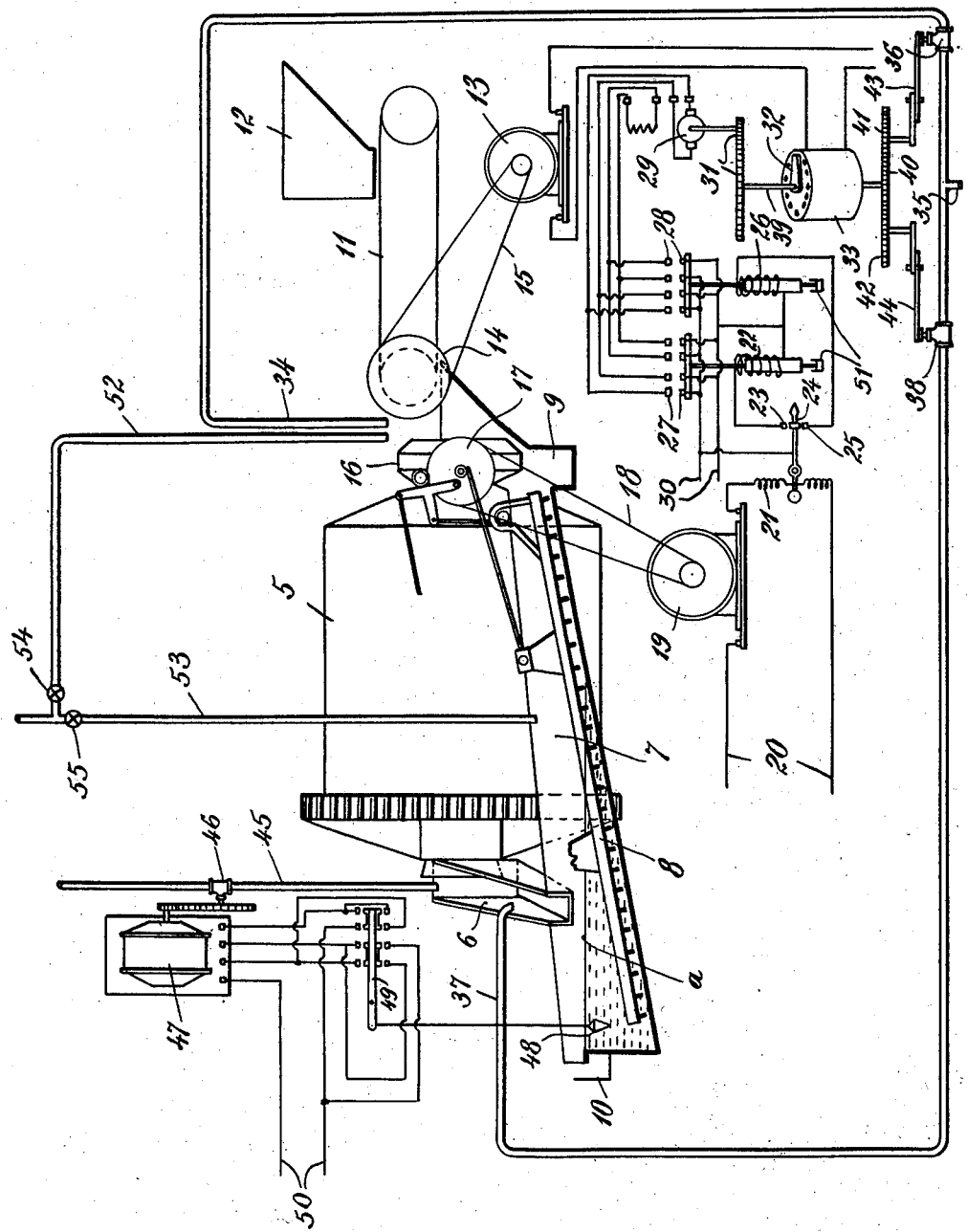

1,619,807

UNITED STATES PATENT OFFICE.

ALFRED LESLIE BLOMFIELD, OF COLORADO SPRINGS, AND ELMER RANDALL RAMSEY, OF DENVER, COLORADO, ASSIGNORS TO THE DORR COMPANY, OF NEW YORK, N. Y., A CORPORATION OF DELAWARE.

TREATMENT OF PULPS.

Application filed April 18, 1923. Serial No. 632,980.

This invention relates to apparatus for treating pulps, and has for its object the provision of certain improvements in such apparatus. More particularly, the invention relates to apparatus which includes a classifier or other suitable means for effecting a separation of solids of different character in the pulp, as, for example, by overflow and settling. The aim of the invention as applied to such an apparatus is the provision of certain improvements in the operation thereof by automatically controlling or regulating the supply or addition of liquid, and preferably also the feeding of the solid component of the pulp, to the apparatus.

Certain features of the invention are applicable to classifiers per se, while other features of the invention are more particularly applicable to classifiers operating in conjunction with a grinding machine, such, for example, as a ball mill or the like. The invention is of particular advantage in a closed circuit grinding system or apparatus, including grinding means, such as a ball mill, discharging into a classifier adapted to effect a separation of different solids in the pulp by overflow and settling, and in which the settled solids are oversize and are returned to the feed of the grinding means.

The invention, in its broad aspect, contemplates the provision, in combination with a classifier, of means for automatically regulating the supply or addition of liquid to the classifier in response to variations in the operating conditions within the classifier. The automatic regulation of the supply or addition of liquid to the classifier may, and usually will, have as its ultimate object the maintenance of the overflow product of the classifier of substantially constant or uniform density or dilution. The regulation of the supply or addition of liquid to the classifier may be in response to any appropriate variable operating condition within the classifier which is representative of, or which may be taken as a measure of, the necessity and nature of the required control of the liquid supply or addition to effect the contemplated result. Thus, the control or regulation of the supply or addition of liquid to the classifier may be in response to variations in the density or dilution of the overflow product of the classifier, or in response to variations in some operating condition or factor within the classifier which is representative of corresponding changes in the dilution or density of the overflow product. Similarly, changes in the resistance of the settled solids in the classifier to removal therefrom, or changes in the amount or weight of the settled solids in the classifier, may be utilized for effecting the contemplated control of the liquid supplied or added to the classifier.

When embodied in a closed circuit grinding system or apparatus, the present invention preferably involves a plurality of adjustable means for supplying or adding liquid thereto. In addition adjustable means for feeding a solid component of the pulp to the apparatus is also preferably provided and, in accordance with the invention, these adjustable means are controlled or regulated automatically in response to variations in some appropriate operating condition within the apparatus.

The novel features of the invention which we believe to be patentable are set forth in the appended claims. In the single figure of the accompanying drawing there is diagrammatically illustrated what we now consider the preferred embodiment of the invention as applied to a closed circuit grinding system or apparatus.

Referring now to the accompanying drawing, there is diagrammatically represented a ball mill 5 discharging through a shoot or launder 6 into a classifier 7. The classifier represented in the drawing is of the well-known Dorr classifier type and comprises an inclined bottom in proximity to which is operatively mounted a reciprocatory raking mechanism 8 for moving settled solids upwardly along the inclined bottom to a hopper or feed-trough 9. The lower part of the classifier constitutes a settling chamber in which the liquid level is indicated by $a$. The overflow product of the classifier is received in a launder 10 and appropriately disposed of.

A belt conveyer 11 carries the raw solid material to be ground in the mill 5 from a hopper or bin 12 to the feed-trough 9.

The belt conveyer is driven by an electric motor 13 operatively connected to the drive pulley 14 of the belt conveyer by means of a belt 15. The solid material in the feed-trough 9, consisting of oversize from the classifier and raw feed from the hopper or bin 12, is picked up by a scoop 16 which in the rotary movement of the mill 5 intermittently dips into the feed-trough 9 and discharges its load into the inlet opening of the mill.

The reciprocatory raking mechanism 8 moves forwardly in close proximity to the inclined bottom of the classifier and in the course of this movement carries along toward the feed-trough 9 such solids as have settled on the inclined bottom. The raking mechanism is then elevated and moved backwards to its initial starting position along a path considerably higher than its path of forward movement. The supporting and operating structures for the reciprocatory raking mechanism have been omitted in the accompanying drawing for the sake of simplicity, but the principal driving elements are shown and comprise a main drive pulley 17 by whose rotation is effected the reciprocating action of the raking mechanism. The drive pulley 17 is connected by a belt 18 to an electric motor 19.

Electric energy is supplied to the motor 19 from the power mains 20. A contact-making electrical measuring instrument 21 is included in the connections between the mains 20 and the motor 19, and is designed to energize the coil 22 of an electro-magnetic switch when the contacts 23 and 24 are closed and to energize the coil 26 of a second electro-magnetic switch when the contacts 25 and 24 are closed.

The instrument 21 is designed to measure the electrical energy delivered to the motor 19 and may advantageously be a demand meter of either the amperemeter or watt-meter type. In principal, the operation of the electrical instrument 21 is such that when the electrical energy delivered to the motor 19 exceeds a predetermined amount, the movable contact 24 moves into engagement with the stationary contact 23, and if the electrical energy delivered to the motor 19 is less than the predetermined amount, the movable contact 24 moves into engagement with the stationary contact 25. As long as the electrical energy delivered to the motor 19 remains substantially constant at the predetermined value the movable contact 24 occupies its neutral position out of engagement with both of the stationary contacts 23 and 25.

The electrical energy delivered to the motor 19 is of course a measure of the power required to drive the reciprocatory raking mechanism 8 of the classifier. The greater the resistance of the settled solids to movement upwardly along the inclined bottom of the classifier, the greater will be the power required to drive the raking mechanism, and vice versa. The practical effect of this is that when a relatively large amount of oversize material is being raked upwardly along the inclined bottom of the classifier into the feed-trough 9, a relatively large amount of electrical energy will be taken by the motor 19, and vice versa. Thus, when the resistance of the settled solids to removal from the classifier (and consequently the amount of such solids being discharged from the classifier into the feed-trough 9) exceeds a predetermined normal value, the electrical instrument 21 operates to energize the coil 22 and close the contacts 27 of one electro-magnetic switch. On the other hand, when the resistance of the settled solids (and consequently the amount of solids discharged from the classifier into the feed-trough 9), is less than such predetermined normal value, the electrical instrument 21 operates to energize the coil 26 and close the contacts 28 of another electro-magnetic switch. When the contacts 27 are closed the electric motor 29 is connected to the power mains 30 for rotation in one direction, while when the contacts 28 are closed the motor 29 is connected to the power mains 30 for rotation in the opposite direction.

The shaft of the motor 29 is connected by a train of reduction gearing 31 to the movable arm 32 of a rheostat 33. The rheostat 33 is included in the circuit of the electric motor 13 which drives, as hereinbefore described, the belt conveyor 11.

When the electrical energy delivered to the motor 19 exceeds the predetermined normal amount and the contacts 27 are closed, the rotation of the motor 29 serves to include additional resistance of the rheostat 33 in circuit with the motor 13 and thereby reduces the speed of the motor 13 and consequently the speed of the conveyor belt 11, whereby a reduction in the amount of raw solid material fed into the feed-trough 9 is effected. On the other hand when the electrical energy delivered to the motor 19 is less than the predetermined normal amount and the contacts 28 are closed, the motor 29 rotates in the opposite direction and serves to reduce the amount of resistance of the rheostat 33 included in circuit with the motor 13, whereby the speed of the motor 13, and consequently the speed of the conveyor belt 11, increases and an increased amount of raw solid material is delivered to the feed-trough 9.

A supply pipe 34 is arranged to deliver liquid, such as water, into the feed-trough 9, where such liquid mixes with the oversize discharge from the classifier and the raw solid material fed from the hopper 12, and, together with these solids, is picked up by the scoop 16 and delivered to the ball mill 5. The pipe 34 is connected to the supply main 35 and the amount of liquid delivered by the main 35 to the pipe 34 is adapted to be controlled or regulated by means of a valve 36. The supply main 35 is also connected to a pipe 37 for supplying or adding liquid, such as water, to the classifier 7, and a valve 38 is provided for regulating or controlling the amount of liquid delivered by the main 35 to the pipe 37.

The valves 36 and 38 are arranged to be automatically actuated by the motor 29. To this end the shaft 39, to which the arm 32 is secured, extends through the rheostat 33 and has a pinion 40 secured thereto. The pinion 40 meshes with gears 41 and 42, which in turn are connected by a system of links 43 and 44, including an eccentric, for manipulating the valves 36 and 38. By this arrangement the quantity of liquid delivered from the pipe 34 to the feed-trough 9 and the quantity of liquid delivered from the pipe 37 to the classifier 7 are regulated by variations in the power required to drive the reciprocatory raking mechanism 8. The arrangement is such that when this power exceeds the predetermined normal amount, the valves 36 and 38 are regulated to decrease the amount of liquid delivered by the pipes 34 and 36, and vice versa.

We have found that the most satisfactory operation of a closed circuit grinding system or apparatus of the character illustrated in the accompanying drawing is generally attained in practice by maintaining the density or dilution of the overflow product of the classifier substantially constant. The regulation of the valve 38, in response to variations in the electrical energy delivered to the motor 19, is accordingly designed, so far as practicable, to effect this result. In some installations this arrangement may not satisfactorily control the density or dilution of the overflow product of the classifier, and in such cases a more direct and positive means for maintaining the density of the overflow product of the classifier substantially constant may be substituted for the supply pipe 37 and its automatically adjustable valve 38, or used in conjunction therewith.

In the accompanying drawing there is shown a second pipe 45 for supplying or adding liquid, such as water, to the classifier 7. The pipe 45 has a valve 46 operatively connected to an electric motor 47. A hydrometer 48 is positioned in the upper part of the settling vessel of the classifier 7 so that it is for all practical purposes in liquid of substantially the same dilution or density as the overflow product of the classifier. The hydrometer 48 is operatively connected to the movable arm 49 of an electric switch, which when moved to its upper position connects the motor 47 to the supply mains 50 for rotation in one direction and when moved to its lower position connects the motor to the mains for rotation in the reverse direction. The arrangement is such that when the density of the overflow product of the classifier exceeds a predetermined value, the hydrometer 48 brings about rotation of the electric motor 47 so as to open more widely the valve 46, and vice versa.

The contact-making electrical instrument 21 is preferably of a type to provide a certain time interval during which the demand of the electric motor 19 must exceed or be less than the predetermined normal value before the contacts 27 or 28, respectively, are closed. This end may be attained by equipping the electromagnetic switches with the dash pots 51, or the like. By such expedients, a time lag is given so that slight instantaneous fluctuations, such as ordinarily occur in practice, will not effect a change in the supply of liquid or raw solids to the apparatus.

Theoretically the amount of water added to the classifier and grinding mill should be approximately in direct proportion to the tonnage of raw ore, or the like, for the same character of ore. A slight variation in water should be made in the classifier in proportion to the amount of colloid present. In general we prefer to add a large proportion, say 80 to 90 per cent, of the total water added to the ball mill and classifier through pipes 52 and 53, respectively, having hand-controlled valves 54 and 55, respectively. By such an arrangement, only a small portion of the total water flow to the apparatus is automatically controlled, and the operator consequently has a convenient means for taking care of unusual conditions, and greater flexibility results.

In general we have found that the automatically controlled liquid supply pipe 34, while it promotes the maintenance of a substantially uniform density or dilution of the overflow product of the classifier, should be supplemented by the automatically controlled liquid supply pipe 37 discharging directly into the classifier. And, if desired, these means for automatically promoting the maintenance of a substantially uniform density or dilution of the classifier overflow may be supplemented by the hydrometer-controlled liquid supply pipe 45, as shown in the accompanying drawing. It will, of course, be understood, however, that all three of these automatically controlled liquid supplying means are not ordinarily necessary, and any one or any two may be employed as the circumstances of any particular case may require.

The present invention provides a simple and effective arrangement for controlling the tonnage in apparatus of the character herein described. In a closed circuit grinding system, such as herein described, the control will ordinarily be adjusted or set so that the ball mill grinding will correspond to the maximum capacity of the classifier, as long as maximum grinding is desired. A ball mill will begin to discharge an excessive amount of oversize or unfinished material as soon as it begins to become overloaded. With rod mills and other types of grinding equipment the load on the classifier, to obtain maximum grinding efficiency, may be less than the maximum capacity of the classifier. Generally, however, the control equipment will be adjusted or set to maintain a predetermined tonnage of oversize removed or discharged from the classifier.

The automatic control of the liquid or water in the apparatus in conjunction with the tonnage control is particularly important, and our experience has demonstrated that it is essential if optimum results are to be obtained. The addition or supply of liquid or water may take place at any appropriate point in the system and ordinarily is such as to maintain the overflow of the classifier of substantially uniform density or dilution.

The present invention, when embodied in a closed circuit grinding system, brings about the following operating advantages; (1) maximum tonnage at any given mesh of grinding, (2) uniform mesh of product, and (3) uniform dilution of product. In addition the invention results in the following advantages from a financial standpoint, (1) minimum metal wear in the grinding mill per ton of material ground, (2) improved extraction due to control of dilution, and mesh of grinding, (3) decreased attention to operation in the grinding department, which in most mills means a reduction in the labor charge, and (4) increased profit per ton on extra tonnage ground as direct result of automatic control equipment.

In the average mill employing closed circuit grinding,—that is, a classifier operating in closed circuit with a grinding mill,—variations occur in the grinding quality of the ore fed to the mill and also variations are apt to occur in the physical composition of the ore, so that the quantity of raw ore fed to the mill by the ordinary feeding devices will vary with variations in certain of the physical properties of the ore. As a result of such variations, the grinding mill and classifier may become alternately overloaded and underloaded during any given period of time.

Ordinarily, the operator is not particularly concerned when the grinding mill and classifier become underloaded. On the other hand, when the grinding mill, and consequently the classifier, become overloaded for a substantial length of time, the classifier ceases to function and the whole grinding and classifying unit must be shut down until the classifier is cleared out and again ready for operation. Such a shut-down causes considerable disturbance to the entire milling operation and involves hard work on the part of the operator to get the unit in operation again. The natural tendency of the operator therefore is to run the feed to the grinding mill and classifier somewhat below the ordinary safe point in order to protect himself against sudden overloads.

The grinding control of our present invention not only maintains the load on the classifier and grinding mill at a higher rate than the operator would otherwise ordinarily set the feed, but also eliminates the low points which occasionally occur, due to comparatively easy grinding of the ore then being fed to the mill.

From a financial standpoint, taking a copper flotation plant as an example, extra tonnage ground as a result of the grinding control of the invention represents more than a saving of grinding costs in that the extra tonnage is actually milled at practically no cost after the coarse crushing stage and up to the point of tailing and concentrate disposal. The extra tonnage resulting from the application of the control of the invention does not increase the daily consumption of metal in the ball mills, nor does it increase the power necessary for the operation of the ball mills, nor is any more labor or attention required. So that, in the usual mill treatment following grinding, no increase can be chargeable to this extra tonnage except such reagents as might be employed.

While we have herein particularly illustrated and described the invention in conjunction with a classifier of the Dorr type, it will of course be understood that the principles of the invention are applicable to other types of apparatus for effecting the separation of solids differing in size, density or in other respects or properties. Thus, for example, the classifier may be of the screen, cone, spitzkasten, etc. types, and the principles of the invention may be advantageously applied to apparatus other than classifiers.

We claim:

1. The improvement in apparatus for the treatment of pulps including a classifier for effecting a separation of solids of different character in the pulp by overflow and settling, which comprises adjustable means for adding liquid to the pulp to be treated in said apparatus, means for producing an action representative of predetermined variations in the accumulation of settled solids in said classifier and means for automatically controlling said adjustable liquids adding means in response to said action.

2. The improvement in apparatus for the treatment of pulps including means for effecting a separation of solids of different character in the pulp, which comprises adjustable means for adding liquid to the pulp to be treated in said apparatus, adjustable means for feeding a solid component of the pulp to said apparatus, means for producing an action representative of predetermined variations in the operating conditions within said apparatus, and means for automatically controlling each of said adjustable means in response to said action.

3. The improvement in apparatus for the treatment of pulps including a classifier for effecting a separation of solids of different character in the pulp by overflowing and settling, which comprises adjustable means for adding liquid to the pulp to be treated in said apparatus, means for producing an action representative of predetermined variations in the density of the overflow product of the classifier, means for automatically controlling said adjustable liquid adding means in response to said action, adjustable means for feeding a solid component of the pulp to said apparatus, means for producing a second action representative of predetermined variations in the operating conditions within said apparatus, and means for automatically controlling said adjustable feeding means in response to said second action.

4. The improvement in apparatus for the treatment of pulps including a classifier for effecting a separation of solids of different character in the pulp by overflow and settling, which comprises adjustable means for adding liquid to the pulp to be treated in said apparatus, means for producing an action representative of predetermined variations in the density of the overflow product of the classifier, means for automatically controlling said adjustable liquid adding means in response to said action, means for feeding a solid component of the pulp to said apparatus, means for producing a second action representative of predetermined variations in the resistance of the settled solids in said classifier to removal therefrom, and means of automatically controlling said adjustable feeding means in response to said second action.

5. The improvement in apparatus for the treatment of pulps including means for effecting a separation of solids of different character in the pulp, which comprises adjustable means for adding liquid to the pulp to be treated in said apparatus, adjustable means for feeding a solid component of the pulp to said apparatus, means for producing two independent actions representative of predetermined variations in operating conditions within said apparatus, means for automatically controlling said adjustable liquid adding means in response to one of said actions, and means for automatically controlling said adjustable feeding means in response to said other action.

6. The improvement in apparatus for the treatment of pulps including a classifier for effecting a separation of solids of different character in the pulp by overflow and settling, which comprises adjustable means for adding liquid to the pulp to be treated in said apparatus, adjustable means for feeding a solid component of the pulp to said apparatus, means for producing an action representative of predetermined variations in the resistance of the settled solids in said classifier to removal therefrom, and means for automatically controlling each of said adjustable means in response to said action.

7. The improvement in apparatus for the treatment of pulps including a classifier for effecting a separation of solids of different character in the pulp by overflow and settling, which comprises adjustable means for adding liquid to the pulp to be treated in said apparatus, means for producing an action representative of predetermined variations in the resistance of the settled solids in said classifier to removal therefrom, and means for automatically controlling said adjustable liquid adding means in response to said action.

8. The improvement in apparatus for the treatment of pulps including means for effecting a separation of solids of different character in the pulp, which comprises a plurality of adjustable means for adding liquid to the pulp to be treated in said apparatus, means for producing two independent actions representative of predetermined variations in operating conditions within said apparatus, means for automatically controlling one of said adjustable liquids adding means in response to one of said actions, and means for automatically controlling another of said adjustable liquid adding means in response to the other of said actions.

9. The improvement in apparatus for the treatment of pulps including a classifier for effecting a separation of solids of different character in the pulp by overflow and settling, which comprises a plurality of adjustable means for adding liquid to the pulp to be treated in said apparatus, means for producing an action representative of predetermined variations in the density of the overflow product of the classifier, means for automatically controlling one of said adjustable liquid adding means in response to said action, means for producing a second action representative of predetermined variations in the operating conditions within said apparatus, and means for automatically controlling another of said adjustable liquid adding means in response to said second action.

10. The improvement in apparatus for the treatment of pulps including a classifier for effecting a separation of solids of different character in the pulp by overflow and settling, which comprises a plurality of adjustable means for adding liquid to the pulp to be treated in said apparatus, means for producing an action representative of predetermined variations in the density of the overflow product of the classifier, means for automatically controlling one of said adjustable liquid adding means in response to said action, means for producing a second action representative of predetermined variations in the resistance of the settled solids in said classifier to removal therefrom, and means for automatically controlling another of said adjustable liquid adding means in response to said second action.

11. The improvement in apparatus for the treatment of pulps including a classifier for effecting a separation of solids of different character in the pulp by overflow and settling, which comprises a plurality of adjustable means for adding liquid to the pulp to be treated in said apparatus, adjustable means for feeding a solid component of the pulp to said apparatus, means for producing an action representative of predetermined variations in the operating conditions within said apparatus, means for automatically controlling said adjustable feeding means and one of said adjustable liquid adding means in response to said action, means for producing a second action representative of variations in the density of the overflow product of the classifier, and means for automatically controlling another of said liquid adding means in response to said second action.

12. The improvement in apparatus for the treatment of pulps including a classifier for effecting a separation of solids of different character in the pulp by overflow and settling, which comprises a plurality of adjustable means for adding liquid to the pulp to be treated in said apparatus, adjustable means for feeding a solid component of the pulp to said apparatus, means for producing an action representative of predetermined variations in the resistance of the settled solids in said classifier to removal therefrom, means for automatically controlling said adjustable feeding means and one of said adjustable liquid adding means in response to said action, means for producing a second action representative of variations in the density of the overflow product of the classifier, and means for automatically controlling another of said liquid adding means in response to said second action.

13. The improvement in apparatus for the treatment of pulps including grinding means discharging into a classifier for effecting a separation of solids of different character in the pulp by overflow and settling, which comprises means for adding liquid to the feed to said grinding means, means for adding liquid to said classifier feed discharging from said grinding means, means for producing an action representative of predetermined variations in the accumulation of settled solids in said classifier, and means for automatically controlling both of said liquid adding means in response to said action.

14. The improvement in apparatus for the treatment of pulps including grinding means discharging into a classifier for effecting a separation of solids of different character in the pulp by overflow and settling, which comprises adjustable means for adding liquid to said classifier, means for producing an action representative of predetermined variations in the resistance of settled solids in said classifier to removal therefrom, and means for automatically controlling said adjustable liquid adding means in response to said action.

15. The improvement in apparatus for the treatment of pulps including grinding means discharging into a classifier for effecting a separation of solids of different character in the pulp, which comprises adjustable means for adding liquid to the material after it leaves the grinder, adjustable means for feeding a solid component of the pulp to said apparatus, and means for automatically regulating each of said adjustable means in response to predetermined variations in the operating conditions within said classifier.

16. The improvement in apparatus for the treatment of pulps including grinding means discharging into a classifier for effecting a separation of solids of different character in the pulp by overflow and settling, which comprises means for adding liquid to the feed to said grinding means and to said classifier in predetermined amount, adjustable means for adding liquid to the feed to said grinding means, adjustable means for adding liquid to said classifier feed discharging from said grinding means, means for producing an action representative of predetermined variation in the accumulation of settled solids in said classifier, and means for automatically controlling said adjustable liquid adding means in response to said action.

17. The improvement in apparatus for the treatment of pulps including a classifier for effecting a separation of solids of different character in the pulp by overflow and settling, which comprises adjustable means for adding liquid to the pulp to be treated in said apparatus, means for producing an action representative of predetermined variations in the accumulation of settled solids in said classifier, means for automatically controlling said adjustable liquid adding means in response to said action, and means for automatically controlling the addition of liquid to said classifier in response to predetermined variations in the density of the overflow product of the classifier.

18. The improvement in apparatus for the treatment of pulps including grinding means discharging into a classifier for effecting a separation of solids of different character in the pulp by overflow and settling, which comprises adjustable means for adding liquid to said classifier, and means responsive to variations in the resistance of the settled solids in said classifier to removal therefrom and operatively associated with said adjustable means for promoting the maintenance of substantially uniform density in the overflow product of said classifier.

19. The improvement in apparatus for the treatment of pulps including grinding means discharging into a classifier for effecting a separation of solids of different character in the pulp by overflow and settling, which comprises means for adding liquid to the feed of said grinding means, means for adding liquid to said classifier feed discharging from said grinding means, means for producing an action representative of predetermined variations in the accumulation of settled solids in said classifier, means for automatically controlling both of said liquid adding means in response to said action, and means for automatically controlling the addition of liquid to said classifier in response to predetermined variations in the density of the overflow product of the classifier.

20. The improvement in apparatus for the treatment of pulps including grinding means discharging into a classifier for effecting a separation of solids of different character in the pulp by overflow and settling, which comprises means for adding liquid to the feed to said grinding means and to said classifier in predetermined amount, adjustable means for adding liquid to the feed to said grinding means, means for producing an action representative of predetermined variations in the accumulation of settled solids in said classifier, means for automatically controlling said adjustable liquid adding means in response to said action, and means for automatically controlling the addition of liquid to said classifier in response to predetermined variations in the density of the overflow product of the classifier.

21. The improvement in apparatus for the treatment of pulps including grinding means discharging into a classifier for effecting a separation of solids of different character in the pulp by overflow and settling, which comprises adjustable means for adding liquid to the pulp to be treated in said apparatus, and means responsive to variations in the resistance of the settled solids in said classifier to removal therefrom and operatively associated with said adjustable means for promoting the maintenance of substantially uniform density in the overflow product of said classifier.

22. The improvement in apparatus for the treatment of pulps including grinding means discharging into a classifier for effecting a separation of solids of different character in the pulp, which comprises adjustable means for adding liquid to said classifier, adjustable means for adding liquid to said grinding means, and means for automatically controlling each of said adjustable means in response to variations in the operating conditions within said classifier.

23. The improvement in apparatus for the treatment of pulps including grinding means discharging into a classifier for effecting a separation of solids of different character in the pulp by overflow and settling, which comprises means for adding liquid to the feed to said grinding means, means for adding liquid to said classifier feed discharging from said grinding means, adjustable means for feeding a solid component of the pulp to said apparatus, means for producing an action representative of predetermined variations in the accumulation of settled solids in said classifier, and means for automatically controlling both of said liquid adding means and said adjustable means for feeding a solid component of the pulp to said apparatus in response to said action.

24. The improvement in apparatus for the treatment of pulps including grinding means discharging into a classifier for effecting a separation of solids of different character in the pulp by overflow and settling, which comprises means for adding liquid to the feed to said grinding means and to said classifier in predetermined amount, adjustable means for adding liquid to the feed to said grinding means, adjustable means for adding liquid to said classifier feed discharging from said grinding means, adjustable means for feeding a solid component of the pulp to said apparatus, means for producing an action representative of predetermined variations in the accumulation of settled solids in said classifier, and means for automatically controlling said adjustable liquid adding means and said adjustable means for feeding a solid component of the pulp to said apparatus in response to said action.

25. The improvement in apparatus for the treatment of pulps including grinding means discharging into a classifier for effecting a separation of solids of different character in the pulp by overflow and settling, which comprises means for adding liquid to the feed to said grinding means and to said classifier in predetermined amount, adjustable means for adding liquid to the feed to said grinding means, adjustable means for adding liquid to said classifier feed discharging from said grinding means, adjustable means for feeding a solid component of the pulp to said apparatus, means for producing an action representative of predetermined variations in the accumulation of settled solids in said classifier, and means for automatically controlling said adjustable liquid adding means and said adjustable means for feeding a solid component of the pulp to said apparatus in response to said action, and means for controlling the addition of liquid to said classifier in response to predetermined variations in the density of the overflow product of the classifier.

In testimony whereof we affix our signatures.

ALFRED LESLIE BLOMFIELD.
ELMER RANDALL RAMSEY.